United States Patent

Guanella

[15] 3,697,875

[45] Oct. 10, 1972

[54] LOW FREQUENCY DISTORTION CORRECTION IN ELECTRIC SIGNALING SYSTEMS

[72] Inventor: Gustav Guanella, Zurich, Switzerland

[73] Assignee: Patelhold Patentverwertungs- & Elektro- Holding AG, Glarus, Switzerland

[22] Filed: Aug. 21, 1970

[21] Appl. No.: 66,017

[30] Foreign Application Priority Data

Aug. 29, 1969 Switzerland .............13121/69

[52] U.S. Cl...................325/65, 178/DIG. 26, 325/42

[51] Int. Cl................................................H04l 25/06

[58] Field of Search............................325/41, 42, 65; 333/15–18; 178/DIG. 26

[56] References Cited

UNITED STATES PATENTS

| | | | |
|---|---|---|---|
| 3,476,875 | 11/1969 | Davis | 325/42 X |
| 2,957,947 | 10/1960 | Bowers | 325/42 |
| 3,343,093 | 9/1967 | Van Gerwen | 325/60 |
| 3,378,771 | 4/1968 | Gerwen et al. | 325/42 |

*Primary Examiner*—Robert L. Richardson
*Attorney*—Greene & Durr

[57] ABSTRACT

In pulse signal transmission, the low-frequency signal components weakened or suppressed by a distorting transmission channel are transmitted in the form of a series of equi-spaced auxiliary pulses intercalated between successive groups of equal numbers of signal pulses. The distorted auxiliary pulses, which may have a zero, constant or quantized amplitude, are segregated at the receiver from the composite receiving signal and the segregated pulses converted by means of a low-pass filter into a subfrequency correcting signal which is applied to the composite signal in proper time phase and amplitude, to restore the original undistorted pulse signal. Where a continuous signal pulse series is transmitted having a constant pulse spacing distance throughout, special time compression and expansion means serve to compress successive groups of the pulses, to provide spacing intervals for the intercalation of the auxiliary pulses at the transmitter, on the one hand, and to restore the original continuous signal pulse series at the receiver, on the other hand.

14 Claims, 13 Drawing Figures

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

LOW FREQUENCY DISTORTION CORRECTION IN ELECTRIC SIGNALING SYSTEMS

The present invention relates to the transmission and recovery of the low signal frequency components of a signal pulse series weakened or suppressed by the transmission channel, such as a conventional telephone line utilized for pulse data or the like digital signal transmission.

In conventional signal transmission channels the lower frequency signal components are frequently attenuated or completely suppressed. Thus, a conventional telephone transmission line is able to transmit frequencies only within a range of about 300 - 3000 cycles per second. In the case of voice transmission, the suppression of the lower signal frequencies is of minor importance as far as intelligibility of the speech is concerned. With other signals, however, such for instance, as the pulse series of a data transmission system being amplitude-modulated or quantized in two or more levels, suppression or weakening of the lower frequencies is ordinarily not admissible.

It has already been proposed, in an effort to overcome this difficulty, or to eliminate or correct low-frequency signal distortion by a transmitting channel, to transpose the signal frequency band to a higher range within the spectrum, whereby the lower frequencies are shifted into a frequency range more suitable and efficient for the transmission. The expenditure of parts in effecting such a solution is however considerable, since aside from the means for effecting the frequency transposition, special synchronizing means are required at the receiver to ensure a retransposition to the original frequency band in proper phase. In the transmission of television signals, the recovery of the lower frequencies is effected in accordance with known practice by the aid of the synchronizing pulses and the use of a biased rectifier, enabling a correction at the start of each scanning line. This solution has however been found useful only where the repetition frequency of the synchronizing pulses is greater than twice the limit frequency of the transmission channel.

Accordingly, an important object of the present invention is the provision of an improved transmitting and correcting system to substantially eliminate low frequency distortion caused by the characteristic of the transmission channel of a pulse signal transmission system of the referred to type, which system is substantially devoid of the referred to and related difficulties of prior distortion correcting means or methods, which is especially suited for use in pulse data transmission over telephone lines or the like communications channels, and which is both simple in construction and efficient and reliable in operation by enabling the use of known digital techniques.

The invention, both as to the foregoing and ancillary objects as well as novel aspects thereof, will be better understood from the following detailed description, taken in conjunction with the accompanying drawings forming part of this specification and in which.

Figure 1:
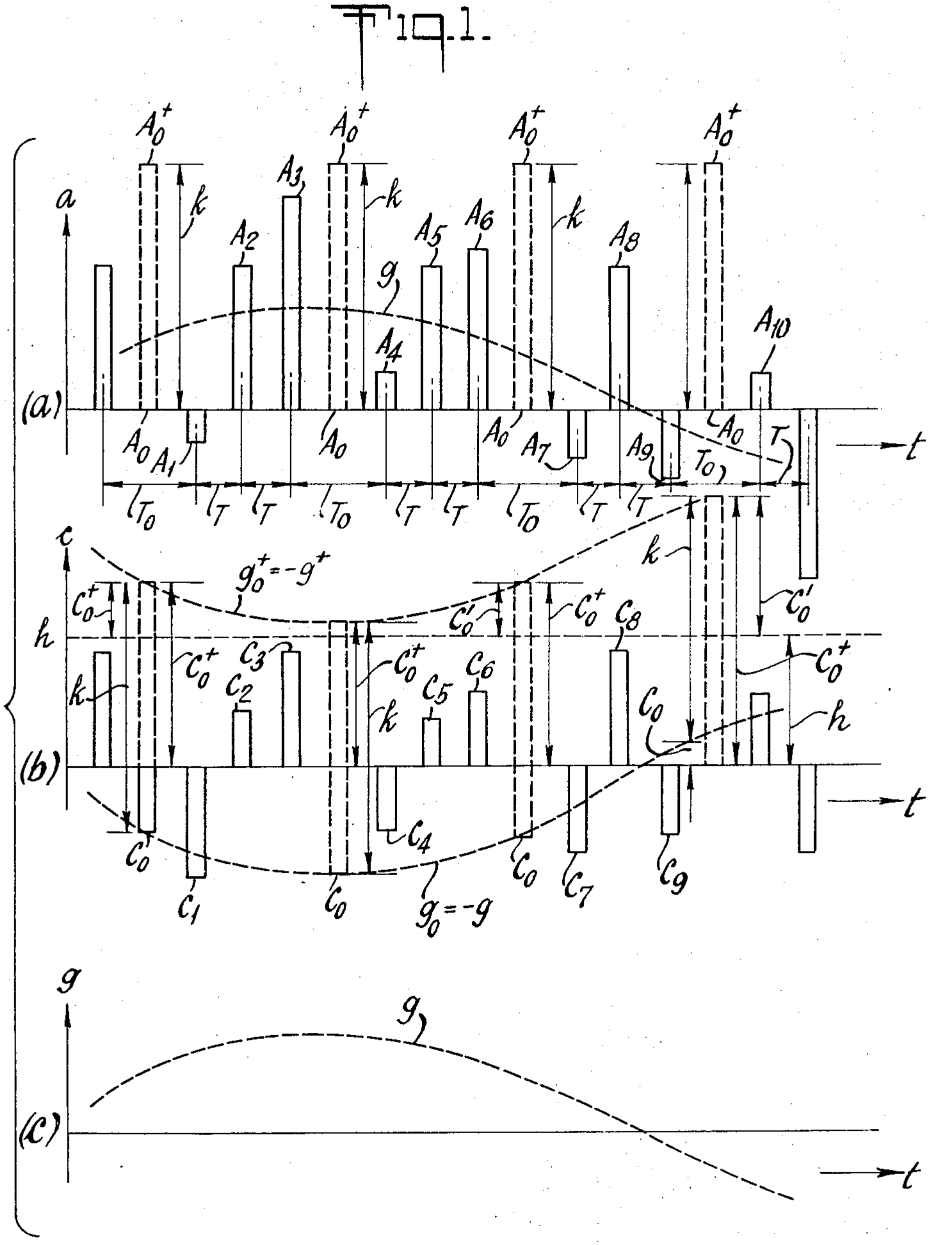
FIG. 1 shows a number of theoretical diagrams explanatory of the basic operation of low-frequency signal transmission by means of auxiliary pulses and distortion correction according to the invention.
Figure 3A:
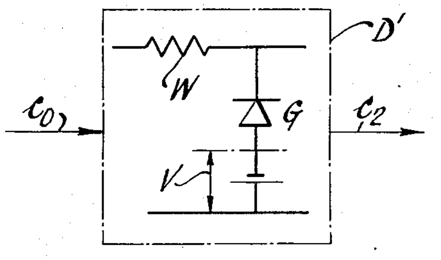
FIG. 3 is a block diagram of a receiving circuit including combined means for correcting both high-frequency or cross-distortion and low-frequency distortion according to the invention.
Figure 3:
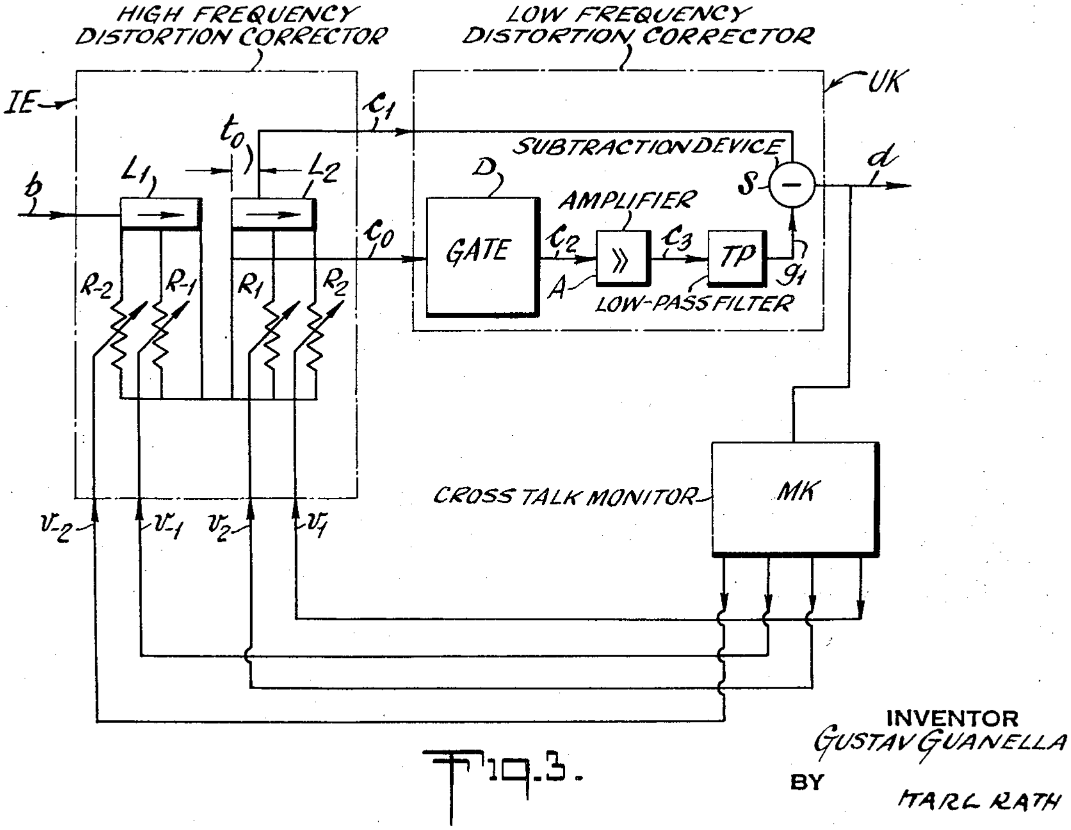
Figure 4:
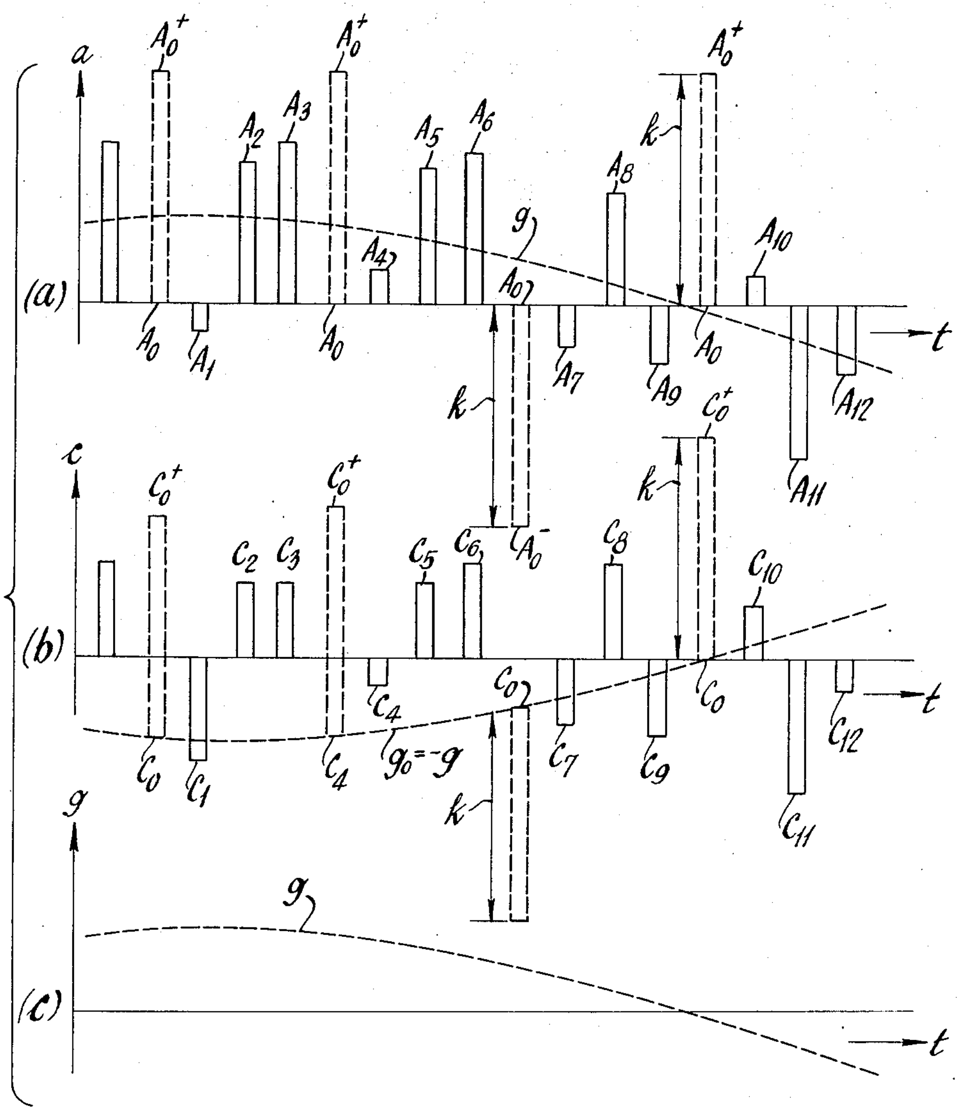
Figure 5:
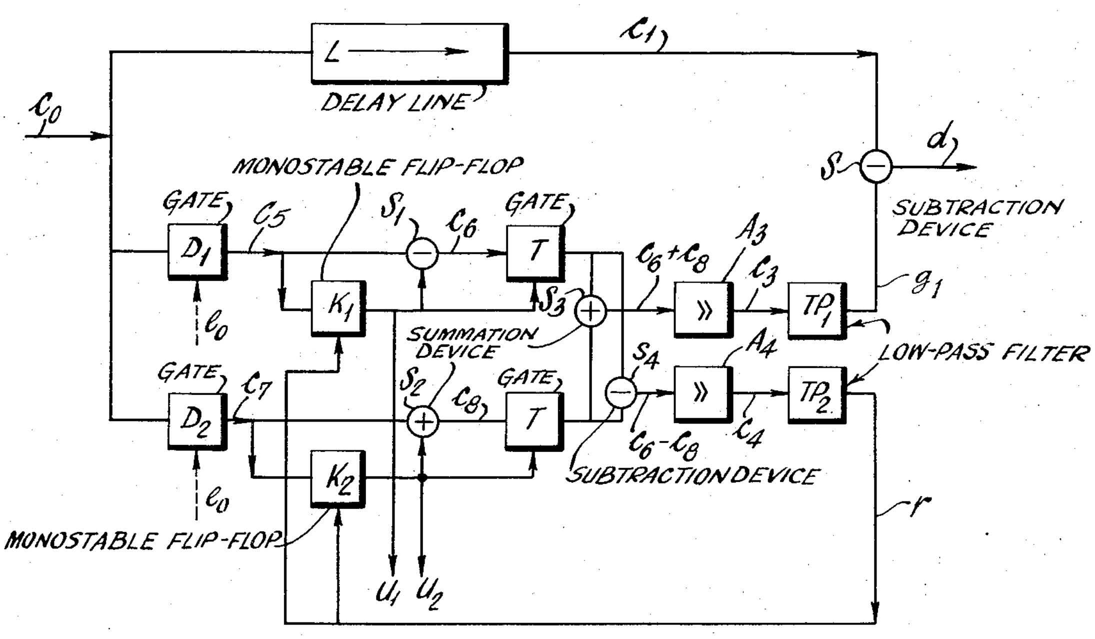
Figure 6:
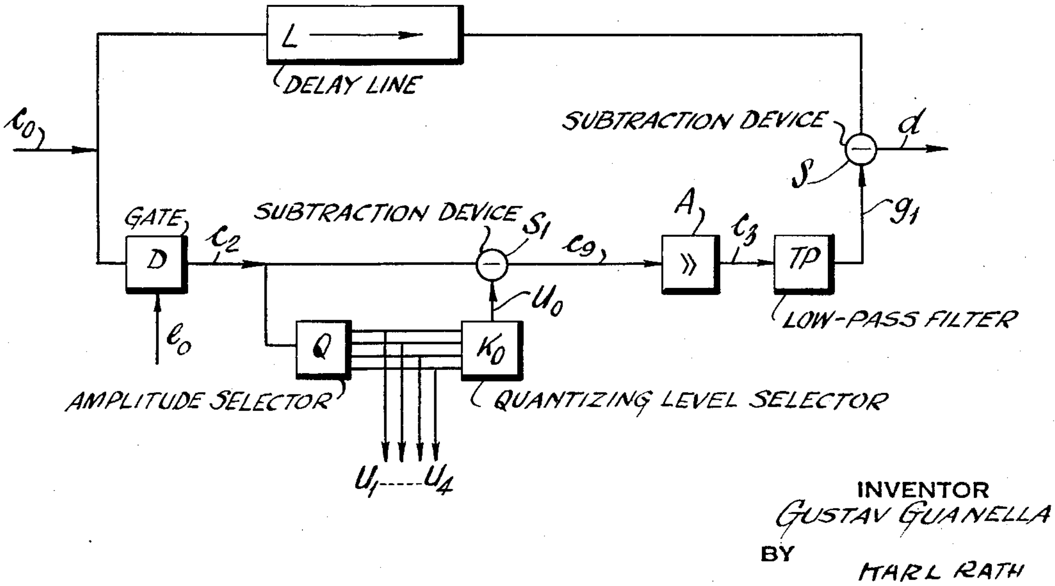
Figure 7:
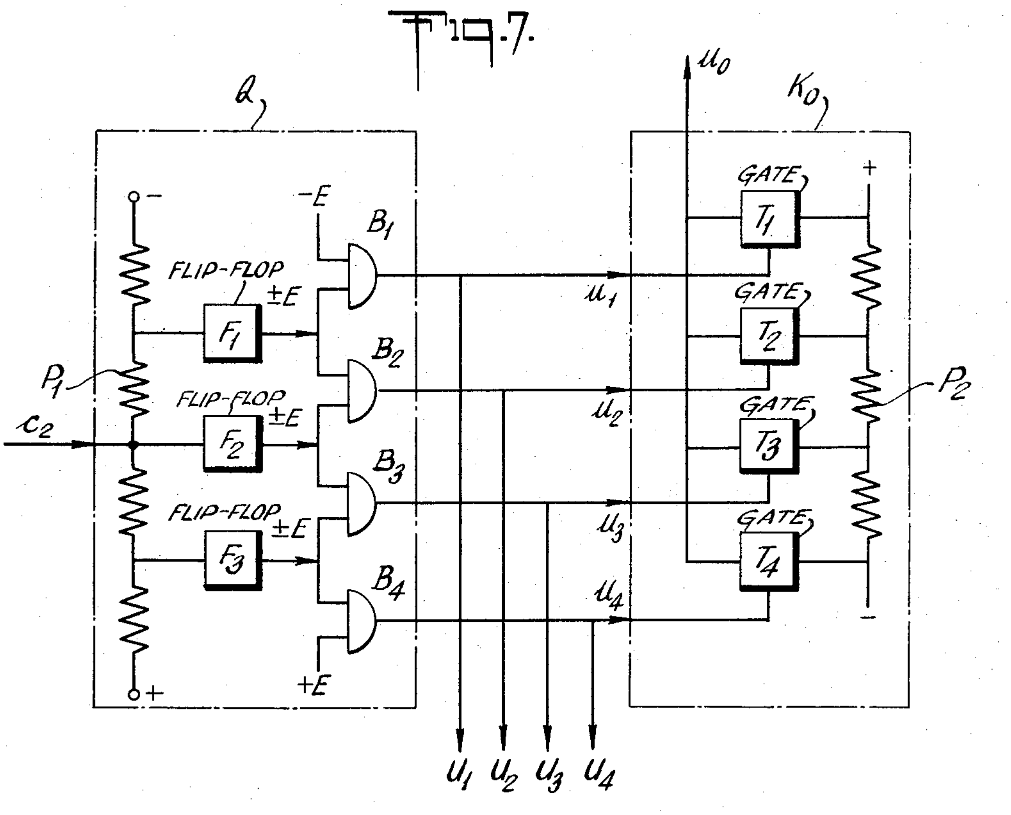
Figure 8:
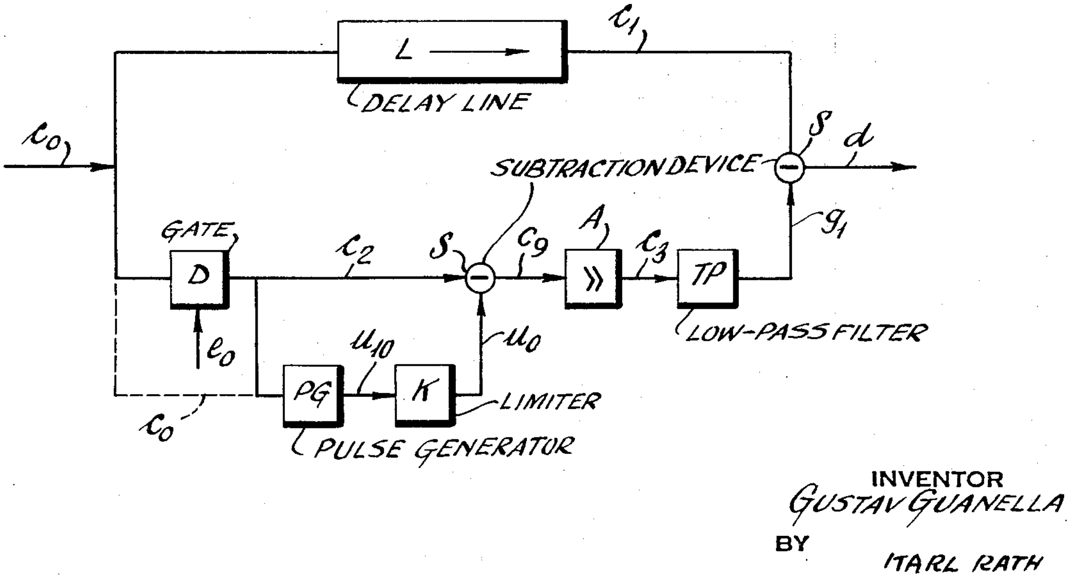
Figure 9:
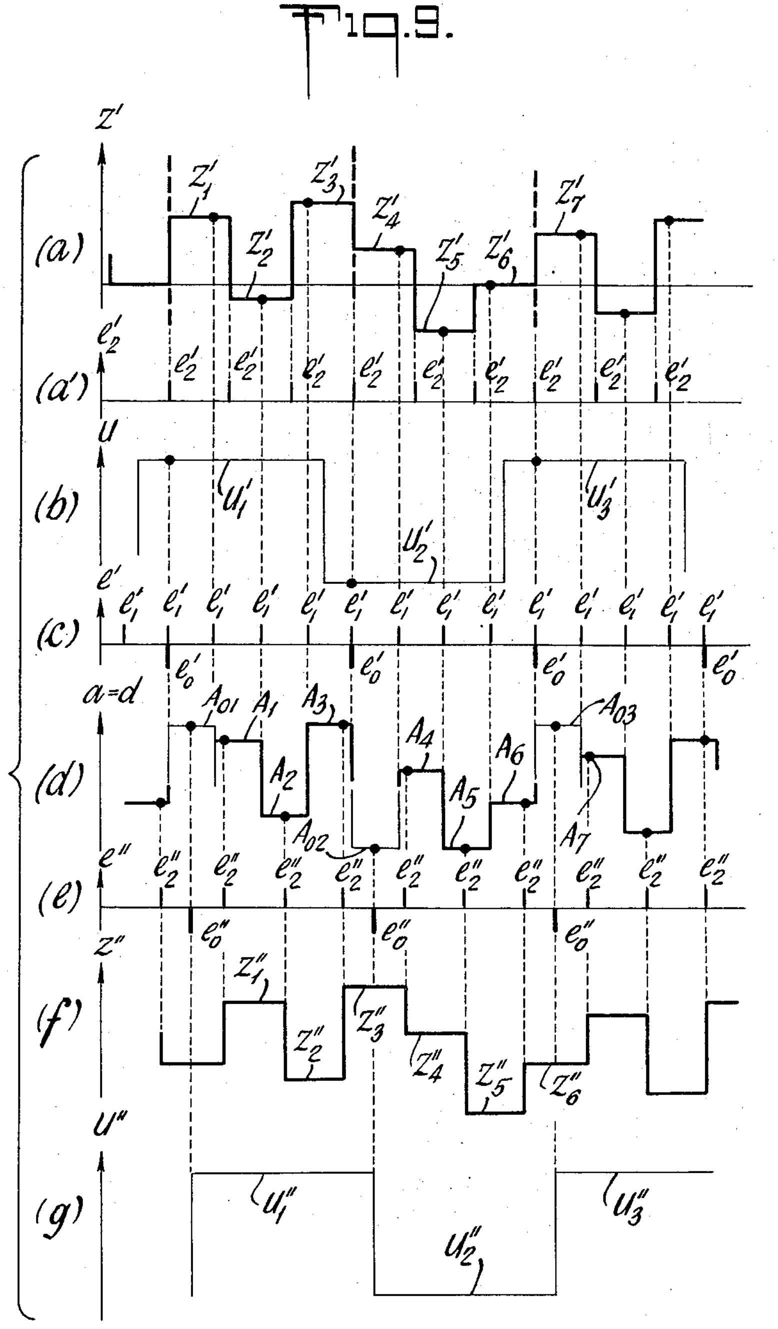
Figure 10:
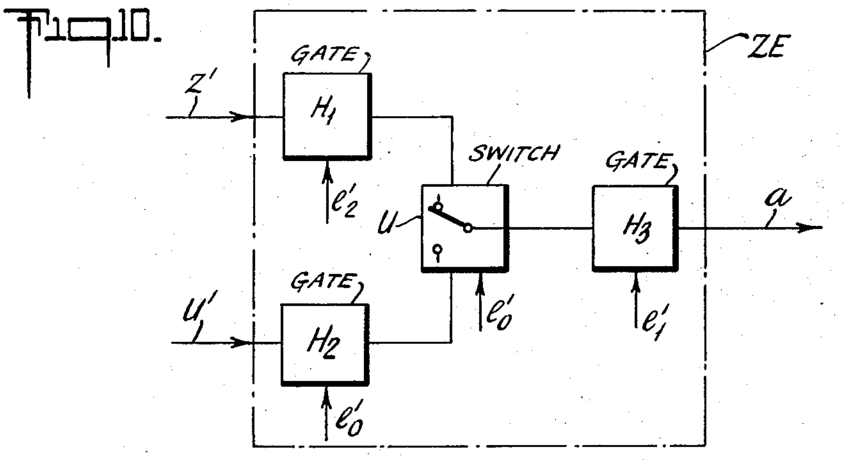
Figure 11:
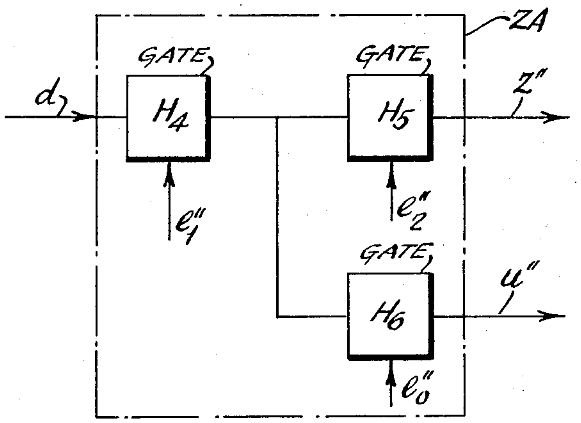
Figure 12:
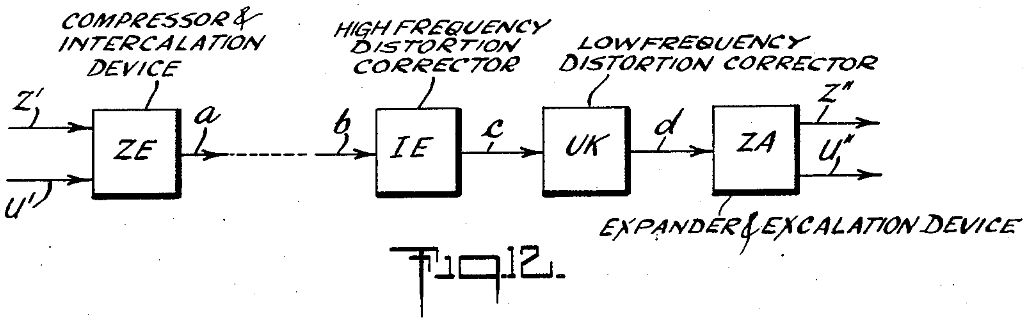

FIG. 3*a* is a partial diagram of FIG. 3, showing a modification;

FIG. 4 shows a number of theoretical diagrams similar to FIG. 1 and relating to an improved feature of the invention;

FIG. 5 is a block diagram of a low-frequency distortion corrector for a system operating according to FIG. 4;

FIG. 6 shows another low-frequency distortion corrector especially designed for amplitude quantized auxiliary pulses;

FIG. 7 shows in greater detail an amplitude and quantizing level selector forming part of FIG. 6;

FIG. 8 shows still another modification of a low-frequency distortion corrector according to the invention;

FIG. 9 shows a number of theoretical diagrams explanatory of the compression and expansion of groups of signal pulses for use in conjunction with the invention;

FIGS. 10 and 11 are block diagrams showing respectively a suitable compressor and expandor for use in a system according to FIG. 9; and FIG. 12 is a block diagram of a complete signal transmission system embodying means for both high-frequency or cross-distortion correction as well as low-frequency correction according to the invention.

Like reference characters denote like parts throughout the different views of the drawings.

The disadvantages of the known solutions of eliminating low-frequency signal distortion are avoided principally according to the present invention by the transmission of intercalated auxiliary pulses simultaneously with the main signal pulses, said auxiliary pulses having equi-distant spacing intervals and either a constant or quantized amplitude. The invention is furthermore characterized by the provision of a correcting system, whereby the auxiliary pulses are segregated from the composite receiving signal, passed through a low-pass filter having a frequency-independent transit time, and re-combined with the composite signal delayed by the same transit time with such sign and amplitude as to result in the undistorted original signal, in a manner as will become apparent as the description proceeds in reference to the drawings.

Referring more particularly to FIG. 1*a*, there is shown a portion of a pulse signal *a* to be transmitted, consisting of a series of amplitude modulated or quantized pulses $A_1$, $A_2$, $A_3$ . . . divided into equal groups $A_1$–$A_{2a}$– $A_3$, $A_4$–$A_5$–$A_6$ . . . of constant pulse spacing intervals T and group spacing intervals $T_o$. The signal component suppressed by the attenuation or elimination of the lower frequencies by the transmission channel is indicated in dashed line, forming the composite sub-frequency signal *g*. In the absence of this signal component, the signals are distorted and appear at the receiver as corresponding distorted pulses $C_1$, $C_2$, $C_3$, . . . 1*b*, wherein the original zero line of the transmitted pulses has been displaced or distorted, as shown by the dashed curve $g_o = -g$.

According to the present invention, there are provided and transmitted auxiliary signal pulses of constant amplitude and separated by equi-distant intervals, said auxiliary pulses being intercalated between the groups of main signal pulses $A_1,A_2,A_3$ . . . or gaps $T_o$. The auxiliary pulses may for instance be in the form of "zero" pulses as indicated at $A_o$ in the figure, that is, pulses whose amplitude measured from the mean or zero line (time axis $t$) are equal to zero. Corresponding to the displaced mean line, the auxiliary pulses appear at the receiver as corresponding distorted pulses $C_o$ upon the line $g_o = -g$. The subfrequency signal $-g$ may be recovered from the distorted pulses by suppression of the higher frequencies, enabling thereby a distortion correction or compensation of the suppressed signal component $g$.

Figure 2:
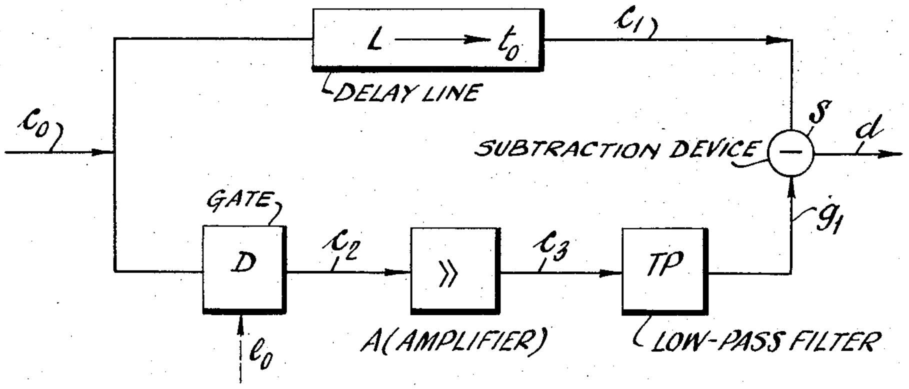
FIG. 2 is a block diagram of a low-frequency distortion corrector for a transmission system operating according to FIG. 1.

A low-frequency recovery circuit or distortion corrector suitable for use in a system according to FIG. 1 is shown by FIG. 2, wherein the gate input circuit D is controlled by timing pulses $e_o$ in synchronism with the auxiliary pulses $C_o$ of the composite input signal $c_o$, in such a manner as to extract from said input signal an output signal $c_2$ containing the auxiliary pulses $C_o$ only. After amplification in the amplifier A (signal $c_3$) and suppression of the higher frequency components in the low-pass filter TP, there is obtained the subfrequency signal $g_1 = g_o\,(t - t_o)$. Depending upon the frequency-independent transit time $t_o$ of the filter TP, this signal involves an additional time delay $t_o$. By the same time period the composite input signal $c_o$ is delayed in the delay line L, to result in the signal $c_1 = c_o\,(t - t_o)$. By subtraction of the signal $g_1$ from the signal $c_1$ in the subtraction device S there is obtained the final output signal $d$ corresponding to the original undistorted transmitting signal $a$, as shown by the following equation:

$$d = c_1 - g_1 = c_o(t-t_o) - g_o(t-t_o) = c_o(t-t_o) + g(t-t_o) = (c_o+g)(t-t_o) = a(t-t_o)$$

Frequently also the higher signal frequencies are subjected to linear or phase distortion during transmission, resulting in a dispersion of the pulses and leading or lagging distortion by one pulse encroaching upon the preceding and following pulses. Compensation of this type of high frequency distortion may be effected by means of a known distortion corrector composed of time delay devices and shown for instance in my U.S. Pat. No. 3,381,245.

A combined low-frequency and high-frequency distortion correcting system of this type is shown in block diagram form by FIG. 3, wherein the distorted input signal $b$ is applied in succession to a high-frequency distortion corrector IE and to a low-frequency distortion corrector UK, the latter corresponding to FIG. 2 at the instant application. The high-frequency or cross-distortion corrector comprises in a known manner a pair of tapped delay lines $L_1$ and $L_2$ for the correction of both leading and lagging cross-distortion respectively, with the tap points of said lines connected to a common summation device via amplitude and polarity regulators $R_{-2}$, $R_{-1}$, $R_1$ and $R_2$, to produce an output signal $c_o$ free from cross-distortion and applied to the low-frequency distortion corrector UK similar to FIG. 1. As a consequence, there is obtained a final undistorted output signal $d$ free from both low-frequency and high-frequency distortion.

In the arrangement according to FIG. 3, the delay device $L_2$ of the cross-distortion corrector IE is utilized to supply the delayed signal $c_1$ by deriving the latter from a suitable tap of said device, dispensing thereby with a special time delay device L, FIG. 1.

Monitoring of variations of the output signal $d$ in FIG. 3, due to faulty adjustment or fluctuations of the high-frequency distortion characteristics of the transmission line, may furthermore be effected in accordance with my copending U.S. Pat. application Ser. No. 871,563, filed Nov. 12, 1969 now U.S. Pat. No. 3,543,160 issued Nov. 24, 1970, by the provision of an additional arrangement MK adapted to produce control signals $v_{-2}$, $v_{-1}$, $v_1$, $v_2$ representative of the residual distortions and serving to influence the regulators $R_{-2}$, $R_{-1}$, $R_1$, $R_2$ respectively, to effect an automatic cross-distortion compensation, as further described in said copending application.

In place of the intercalated pulses of "zero" amplitude $A_o$, or the provision of simple gaps or intervals $T_o$ between the groups of signal pulses $a$, it is possible to utilize intercalated pulses of constant amplitude k as indicated at $A_o^+$ in FIG. 1$a$. As a consequence, there are obtained after transmission the corresponding distorted receiving pulses $C_o^+$, FIG. 1b. These auxiliary pulses may again be segregated by the gate D from the composite receiving signal $c_o$ and are equally suited for the recovery of the low-frequency components by the arrangement according to FIG. 2, due to the fact that the peaks of said pulses coincide with a curve $g_o^+ = -g^+$ which, aside from a constant direct current voltage, corresponds to the subfrequency signal $-g$ suppressed during transmission. The constant additional voltage h may be suppressed by a direct current biasing voltage applied for instance to the input of the amplifier A.

Where the intercalated pulses $A_o^+$ have a sufficient amplitude, as shown in FIG. 1, the gate D may be replaced by a simple threshold circuit or limiter D' shown in FIG. 3$a$ and consisting of a biased rectifier G and series resistor W. There are thus obtained the auxiliary pulses $C_o'$, FIG. 1$b$, which, after suppression of the higher frequency produce the sub-frequency signal $-g$ displaced by the constant voltage $h$ from the zero line.

It is also possible to vary the amplitude of the intercalated auxiliary pulses $A_o$ between constant values $A_o^+$ and $A_o^-$ according to a prearranged program or an additional message transmitted in binary or any other form, as shown in FIG. 4$a$. From the polarity-keyed pulses there are obtained after transmission the auxiliary pulses $C_o^+$ and $C_o^-$ respectively, FIG. 4$b$.

In the latter case, the low-frequency distortion corrector at the receiver, FIG. 5, must include means preceding the correcting circuit proper, FIG. 2, to convert the received and distorted polarity-modulated pulses into a pulse series having peak amplitudes coinciding with the subfrequency signal $-g$. There are provided for this purpose in FIG. 5 means to segregate the auxiliary pulses from the composite receiving signal $c_o$ comprising two synchronized gates $D_1$ and $D_2$ including rectifiers, whereby $D_1$ passes the positive auxiliary pulses and $D_2$ passes the negative auxiliary pulses. The positive pulses or signal $c_5$ control a monostable flip-flop or the like $K_1$ which supplies corresponding output pulses $u_1$ having a constant amplitude $k$ and predetermined pulse duration. By subtraction of these constant pulses from the pulses $c_5$ in $S_1$, there are obtained the final pulses $C_o^+$ of the signal $c_6$, FIG. 4. In an analogous manner the negative auxiliary pulses $C_o^-$ are segregated from the received signals $c_o$ in $D_2$, the resultant pulse signals forming the signal $c_7$. Each individual pulse of the latter again releases in the monostable flip-flop $K_2$ corresponding pulses $u_2$ of constant amplitude and duration. By addition of $u_2$ and $c_7$ in $S_2$ there is obtained the final signal $c_8$ consisting of the individual pulses $C_o^+$. Finally, the pulses of the signals $c_6$ and $c_8$ are passed through gate circuits T and combined in the summation device $S_3$, whereby to produce a pulse series $c_6 + c_8$ at the input of the amplifier $A_3$ containing all the pulses $C_o^+$ and $C_o^-$ according to FIG. 4 with their peaks coinciding with the subfrequency signal $-g$. The latter is again recovered by amplification in $A_3$ and suppression of the higher frequency in $TP_1$, to result in the signal $g_1$, in substantially the same manner as described in reference to FIG. w.

The constant amplitude of the correcting pulses $u_1$ and $u_2$ produced by $A_1$ and $A_2$ respectively must correspond to the value $\pm k$ as shown in FIG. 4. A fluctuation of the amplitudes during transmission may result in interference with the recovery of the pulses $C_o^+$ and $C_o^-$. The peaks of $C_o^+$ may for instance be above the signal $-g$ and the peaks of the pulses $C_o^-$ may be below the signal. In order to detect any deviations, the difference $c_6 - c_8$ is formed in $S_4$. The mean value of this difference corresponds to the amplitude error of $u_1$ and $u_2$. In order to produce a control voltage r corresponding to this mean value, the signal $c_6 - c_8$ is amplified in $A_4$ and smoothed in the low-pass filter $TP_2$. The control voltage r may be utilized, to control the receiving amplifier, i.e., the amplitude control of $c_o$, or to control the output amplitudes of $K_1$ and $K_2$, to effect an automatic reduction of the amplitude deviations of $u_1$ and $u_2$.

In place of polarity-keying or two-level quantization of the auxiliary pulses as shown by FIG. 4*a*, amplitude quantizing with several predetermined levels may be employed. Thus, in the receiving arrangement according to FIG. 6 a keying of the auxiliary pulses according to four positive quantizing levels is assumed. The auxiliary pulses are again segregated from the composite receiving signal $c_o$ by means of a synchronized gate D. The obtained auxiliary pulses $c_2$ are displaced relative to the fixed quantizing levels due to the suppression of the lower signal frequencies during transmission. The amplitude selector Q serves to determine the closest adjacent quantizing levels of the individual pulses, said quantizing levels being represented by corresponding pulses $u_1 - u_4$, whereby an output pulse $u_o$ is produced by the quantizing level selector $K_o$ whose amplitude corresponds to the prevailing closest quantizing level. By subtraction of $u_o$ from $c_2$ in $S_1$ there are obtained the final pulses $c_9$ whose peaks are positioned upon the subfrequency signal $g$. The latter is again recovered by amplification in A and suppression of the higher frequencies in the low-pass filter TP, in substantially the same manner as in the case of FIG. 2.

The amplitude selector Q for the determination of the closest adjacent quantizing level may contain, as more clearly shown by FIG. 7, a number, three according to the example shown, of limiters and flip-flops $F_1$, $F_2$, $F_3$ biased by means of a potentiometer $P_1$ by input voltages varying in a positive and negative sense relative to the input signal $c_2$ according to the quantizing levels of the system. In an arrangement of this type, the highest amplitude quantizing level of the signal $c_2$ results in positive input voltages and in turn positive output voltages +E of $F_1$, $F_2$ and $F_3$. $B_1$, $B_2$, $B_3$ and $B_4$ are logical selector circuits producing an output pulse only in case of unequal or opposite input voltages, whereby with $F_1$, $F_2$, and $F_3$ having positive outputs +E only the device $B_1$ will respond and produce an output pulse $u_1$. If the amplitude of $c_2$ is reduced to the next lower quantizing level, the input voltage of $F_1$ remains negative, whereby to result in a corresponding output pulse −E, while $F_2$ and $F_3$ retain their positive outputs +E. As a consequence, now the polarity selector $B_2$ responds and produces an output pulse $u_2$ corresponding to the lower quantizing level.

In a similar manner, output pulses $u_3$ and $u_4$ are produced corresponding to the next lower quantizing levels. The pulses $u_1$, $u_2$, $u_3$ and $u_4$ in turn control, via gates $T_1$, $T_2$, $T_3$ and $T_4$ and potentiometer $P_2$, the quantizing level selector $K_o$, whereby to result in a final output signal $u_o$ corresponding to the closest quantizing levels to the input signal $c_2$ for utilization in the low-frequency distortion correction, in the manner explained in reference to FIG. 6.

The described determination of the closest quantizing level to the distorted input pulses $c_2$ is useful only if the amplitude displacements of the distorted pulses are small enough as not to encroach upon the adjacent quantizing levels. In other words, the sum of all the distortions and disturbances must remain less than half the distance between adjacent quantizing levels. In order therefore to maintain the effect of low-frequency suppression within close limits, the intervals between the auxiliary pulses should be kept sufficiently small.

In case of a constant amplitude of the auxiliary pulses, it is necessary that the repetition frequency of the pulses be at least twice the limit frequency of the low-pass filter TP, to ensure a correct determination of the subfrequency signal $g$. On the other hand, the limit frequency of the filter should be greater than all of the signal frequencies to be recovered by the system. In the case of intercalated pulses of varying sign (two-level quantization) and, especially, in the case of multi-level amplitude quantization, it is necessary to increase the repetition frequency of the auxiliary pulses relative to the referred to minimum value sufficiently, to ensure a correct quantizing level determination, independently of the remaining signals.

A special case obtains where the sequence of the auxiliary pulses is known at the receiver. In this case, the pulses are no longer suitable as carriers for a special message. FIG. 8 shows a distortion correction system for such a case, wherein the pulse generator PG produces a pulse series corresponding to the intercalated auxiliary pulses. This generator is equal to the generator for producing the auxiliary pulses at the transmitter and may be maintained in synchronism with the latter, such as by means of the input signal pulses $c_o$ serving as a synchronizing signal. Generator PG advantageously consists of a shift register having its output fed back upon its input through logical circuits, to result in the production of a quasi-statistical pulse series.

The pulse series $u_{10}$ produced by the generator PG is limited in the circuit K, to provide pulses of constant positive or negative amplitude of the signal $u_o$. By subtraction of the pulses $u_o$ from the pulses $C_o^+$ or $C_o^-$, there results a pulse series $c_9$ composed of individual pulses $C_o$ whose peaks coincide with the subfrequency signal $-g$. Again, correction of the low-frequency distortion may be achieved in the manner described.

The afore-described use of a quasi-statistical auxiliary pulse series may be utilized for the attainment of special effects, such as, for example, the synchronization of a predetermined signal of low repetition period or for the recognition of a calling transmitter and the like uses.

In the foregoing, it has been assumed that equal spacing distances or gaps $T_o$ exist between the groups of signal pulses $A_1, A_2, A_3 \ldots$, FIGS. 1 and 4, suitable for the interposition of the auxiliary pulses $A_o$ and $A_o^+$, respectively.

Where the system according to the invention is used in connection with the transmission of an uninterrupted pulse series composed of equi-distant signal pulses of any amplitude, it is proposed in accordance with a further feature of the invention to subdivide the continuous pulse series into groups or sections of equal length and to produce gaps within said groups by time compression of each section, for the interposition of the auxiliary pulses. At the receiver it is then necessary, after segregation of the auxiliary pulses and low-frequency distortion correction, to subject the groups of signal pulses to a corresponding expansion, to restore the original signal pulse series.

The time compression and expansion of the subgroups may be effected in accordance with the diagram of FIG. 9 and by means of compression and expanding circuits as shown by FIGS. 10 and 11, respectively.

Referring to FIG. 9, the original signal to be transmitted is assumed to consist of an uninterrupted sequence of pulses $Z_1', Z_2', Z_3' \ldots$ The sections or subgroups to be formed are indicated by the dashed vertical lines in FIG. 9a, each group comprising, in the example shown, three pulses $Z_1' - Z_2' - Z_3'$, $Z_4' - Z_5' - Z_6'$ ... FIGS. 9a to 9e demonstrate the function of the apparatus of FIG. 10 in compressing the continuous pulse signal $z'$, FIG. 9a, into groups spaced by gaps or intervals for the intercalation of the auxiliary pulses $u'$, FIG. 9b, being quantized in two levels or polarities as shown by FIG. 4. The signals $z'$, which may be in the form of an interrupted pulse series such as shown at $A_1, A_2, A_3 \ldots$ in FIG. 4, are at first scanned periodically by the gate $H_1$ controlled by timing pulses $e_2'$, FIG. 9a', to produce amplitude modulated signal pulses $Z_1', Z_2', Z_3' \ldots$ according to FIG. 9a.

On the other hand, the auxiliary signal $u'$ is scanned periodically by the gate $H_2$ controlled by the timing pulses $e_o'$, FIG. 9c, to produce auxiliary pulses $A_{01}, A_{02}, A_{03} \ldots$, FIG. 9d. The repetition frequency of the timing pulses $e_2'$ may for instance be 3,000 per second, while the repetition frequency of $e_o'$ may be 1,000 per second. The purpose of the arrangement according to FIG. 10 is to produce a new pulse series including intercalated pulses and having a repetition frequency equal to the sum of the repetition frequencies of the pulses $e_2'$ and $e_o'$, that is, a frequency equal to 4,000 per second according to the example. To this end, the changeover switch U combining the output signals of $H_1$ and $H_2$ is controlled by the timing pulses $e_o'$ in such a manner that, at the occurrence of the latter a transmission occurs through switch U of the momentary values of $U_1', U_2', U_3' \ldots$ as indicated by solid circles in the drawing (FIG. 9). During the remaining time periods transmission by switch U occurs of the pulses $Z_1', Z_2', Z_3' \ldots$ The further switch or gate $H_3$ connected to the output of U is controlled by the timing pulses $e_1'$, FIG. 9c, having a repetition frequency of 4,000 per second according to the example. In other words, gate $H_3$ passes the momentary values of both $Z_1', Z_2', Z_3' \ldots$ and $U_1', U_2', U_3' \ldots$ as indicated by the solid circles in FIGS. 9a and 9b, respectively, which values are stored up to the next scanning instants, in such a manner as to result in the final signal $a$ in the output of $H_3$ being composed of pulses $A_{01}, A_1, A_2, A_3, A_{02}, \ldots$, that is, constituting the composite transmitting signal of the type shown by FIG. 4.

The signal $a$ is transmitted to the receiver and freed from distortion in the manner described, to restore the original signal $d=a$ consisting of groups of signal pulses $Z_7'$, FIG. 9a, and intercalated auxiliary pulses $U_n$, FIG. 9b, and having a repetition frequency of 3,000 + 1,000 = 4,000 per second.

The arrangement according to FIG. 11 serves for the recovery of the original signal pulse series $Z_1', Z_2', Z_3' \ldots$ of FIG. 9a, as well as of the auxiliary pulse series $U_1', U_2', U_3'$ of FIG. 9b. The received and corrected pulse series is at first scanned by a gate $H_4$ controlled by scanning pulses $e_1''$ which correspond to the scanning pulses $e_1'$ at the transmitter. In this manner it is possible to clear the received signals of slight time deviations. As a consequence, the output signal of $H_4$ corresponds to the amplitude modulated pulse series according to FIG. 9d. The gate or scanning device $H_5$ having its input connected to the output of $H_4$ is controlled by the timing pulses $e_2''$ corresponding to the timing pulses $e_2'$ except for a slight time displacement, as shown in FIG. 9e. Pulses $e_2''$ serve to scan the amplitude modulated pulses $A_1, A_2, A_3 \ldots$, FIG. 9d at the instants indicated by the solid circles with the scanned values being stored from one to the next scanning operation. As a consequence, there are obtained at the output of $H_5$ the signal $z''$ or pulses $Z_1'', Z_2'', Z_3'' \ldots$ according to FIG. 9f. The latter correspond to the pulses $Z_1', Z_2', Z_3' \ldots$ of FIG. 9a, except for a constant time displacement, their repetition frequency again being 3,000 per second according to the example.

On the other hand, the gate $H_6$ also having its input connected to the output of $H_4$, is controlled by the timing pulses $e_o''$, FIG. 9e, which are slightly time displaced relative to $e_o'$ and serve to scan the momentary values $A_{01}, A_{02} \ldots$ of FIG. 9d as indicated by the solid circles, which values are again stored from one to the next scanning operation. As a consequence, there is obtained at the output of $H_6$ the pulse series $U_1'', U_2'', U_3'' \ldots$, FIG. 9g, corresponding to the pulses $U_1', U_2', U_3' \ldots$ except for a constant time displacement. The pulses $U_1'', U_2'', U_3'' \ldots$ may be utilized for the reconstruction of the subfrequency signal $g$ in UK, dispensing thereby with the special gates $D_1$ and $D_2$, FIG. 5.

FIG. 12 shows a complete signal transmission system according to the invention, comprising a transmitter including a time compression and intercalation device ZE according to FIG. 10, to produce a composite transmitting signal *a*, and a receiver including a high-frequency distortion corrector IE excited by the receiving signal *b*, a low-frequency distortion corrector UK excited by the output signal *c* of IE, and a time compression and excalation device ZA according to FIG. 11.

In the foregoing, the invention has been described in reference to a few exemplary devices or embodiments. It will be evident however, that variations and modifications, as well as the substitution of parts and devices similar and/or equivalent to those shown herein for illustration, may be made in accordance with the broader scope and spirit of the invention.

I claim:

1. A system for the transmission of amplitude-modulated pulse signals subject to distortion by weakening or suppression by the transmitting channel of low-frequency signal components, forming a pre-determined subfrequency signal comprising in combination:
   1. a transmitter including
      a. means to produce a series of signal pulses modulated according to the information to be transmitted,
      b. further means to simultaneously produce a series of equi-spaced auxiliary pulses of predetermined amplitude and intercalated between successive groups of equal numbers of signal pulses, to provide a composite transmitting signal of constant pulse spacing interval and comprised of both said signal and auxiliary pulses, and
   2. a receiver including
      a. means to segregate the auxiliary pulses from the received composite signal,
      b. low-pass filter means having a frequency-independent transit time, to convert the segregated auxiliary pulses into said subfrequency signal and to eliminate those signals whose frequencies are greater than the subfrequency signal,
      c. means to time delay the received composite signal by a period equal to the transit time of said filter means, and
      d. means to combine the subfrequency signal derived from said filter means with the time-delayed composite signal, and develop a signal at the output of the combining means constituting the signal pulses transmitted by the transmitter, to restore the original undistorted pulse signal.

2. In a signal transmission system as claimed in claim 1, wherein said auxiliary pulses have a constant amplitude and polarity in respect to the mean line of said signal pulses.

3. In a signal transmission signal as claimed in claim 1, wherein said auxiliary pulses have a substantially zero amplitude in respect to the mean line of said signal pulses.

4. In a signal transmission system as claimed in claim 1, wherein said auxiliary pulses vary between positive and negative polarities of constant amplitudes according to an auxiliary message to be transmitted, and means and said receiver to individually segregate the auxiliary pulses of positive and negative polarity and to combine the segregated pulses into a single pulse series with their peak amplitudes coinciding with said subfrequency signal, prior to its application to said filter means.

5. In a signal transmission system as claimed in claim 4, wherein the repetition frequency of the auxiliary pulses is in excess of three times the limit frequency of said filter means.

6. In a signal transmission system as claimed in claim 1, wherein said auxiliary pulses are quantized according to a predetermined number of fixed quantizing levels for the transmission thereby of an auxiliary intelligence, means at said receiver to convert the segregated auxiliary pulses into local pulses of the closest quantizing level, and means to apply said local pulses to said low-pass filter means for producing said subfrequency signal.

7. In a signal transmission system as claimed in claim 6, wherein the repetition frequency of the auxiliary pulses is in excess of four times the limit frequency of said low-pass filter means.

8. In a signal transmission system as claimed in claim 1, including means to remove the auxiliary pulses from the restored undistorted composite signal.

9. In a signal transmission system as claimed in claim 1, including high-frequency distortion correcting means preceding the low-frequency distortion correcting means at the receiver and including at least one delay line, and means to derive the delayed composite signal combined with said subfrequency signal from said delay line.

10. In a signal transmission signal as claimed in claim 1, wherein said auxiliary pulses are segregated from the composite signal by means of a gate controlled periodically at the repetition frequency of said auxiliary pulses.

11. In a signal transmission signal as claimed in claim 1, wherein said auxiliary pulses have an amplitude in excess of said signal pulses and are segregated from the latter by an amplitude clipping device.

12. In a signal transmission system as claimed in claim 1, wherein the repetition frequency of the auxiliary pulses of constant amplitude is at least twice the limit frequency of said low-pass filter means.

13. In a signal transmission system as claimed in claim 1, wherein said pulse signals are equi-spaced at a predetermined pulse repetition frequency, time compression means at said transmitter to compress groups of equal numbers of signal pulses into pulses of increased repetition frequency, to provide spacing intervals between said groups equal to the pulse spacing intervals and suitable for the intercalation of said auxiliary pulses, and time expansion means at said receiver to expand the received and distortion-freed groups of pulses into the original undistorted signal pulse series.

14. In a signal transmission system as claimed in claim 13, wherein said time compression means comprises a periodic changeover switch having a pair of inputs and an output and operated at the repetition frequency of said auxiliary pulses, means to apply the signal pulses to one of said input and to apply the auxiliary pulses to the other input, and a periodic gate circuit operated at a frequency equal to the sum of the frequencies of said signal and auxiliary pulses and connected to the output of said changeover switch, and wherein said time expansion means comprises a further periodic gate circuit operated at the frequency of said pulse signals and excited by the distortion-freed pulse signals.

* * * * *